(No Model.) 2 Sheets—Sheet 2.
M. BROWN.
CORN OR COTTON PLANTER.
No. 530,256. Patented Dec. 4, 1894.
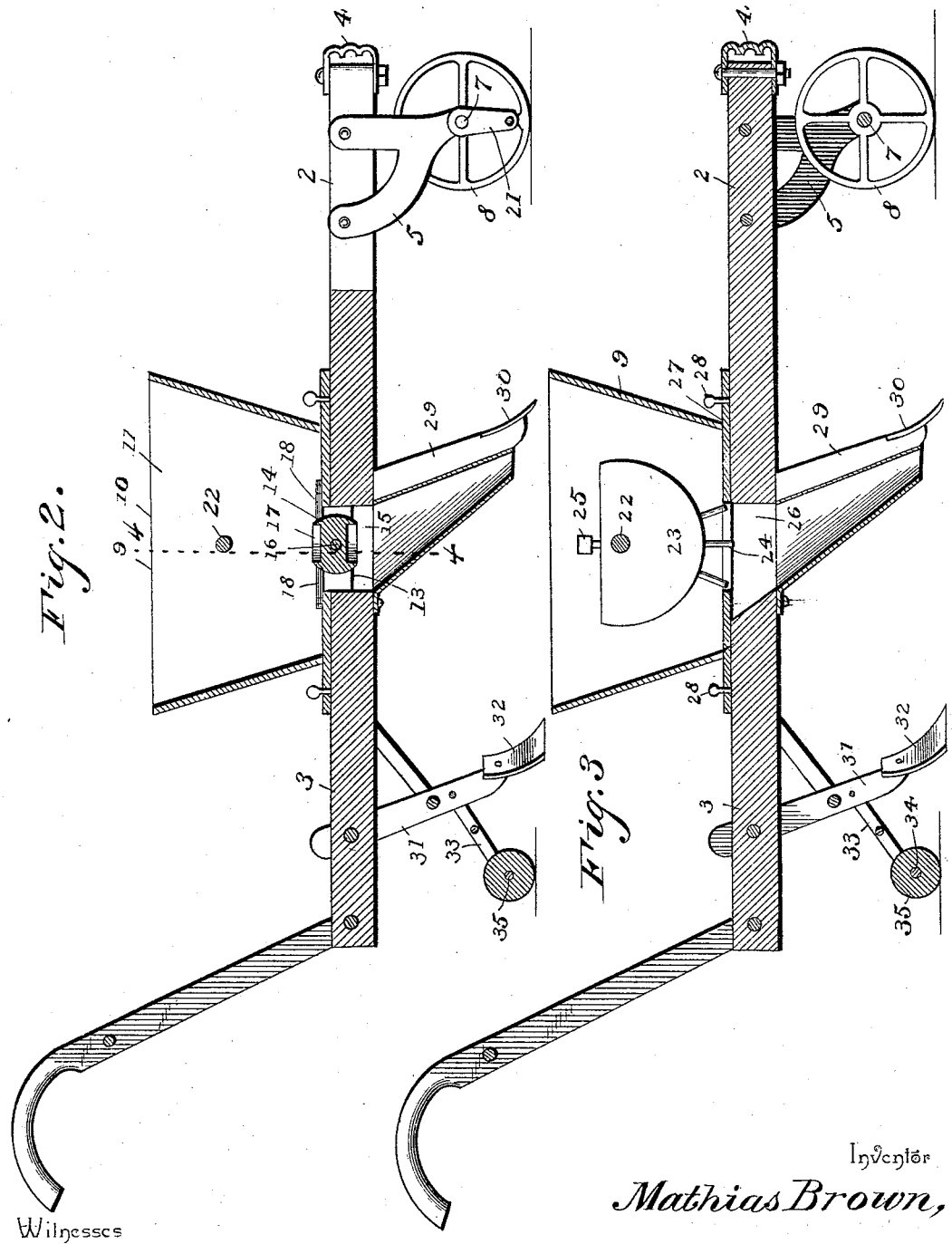
Witnesses
Julius Ulke, Jr.
Inventor
Mathias Brown,
By his Attorneys.

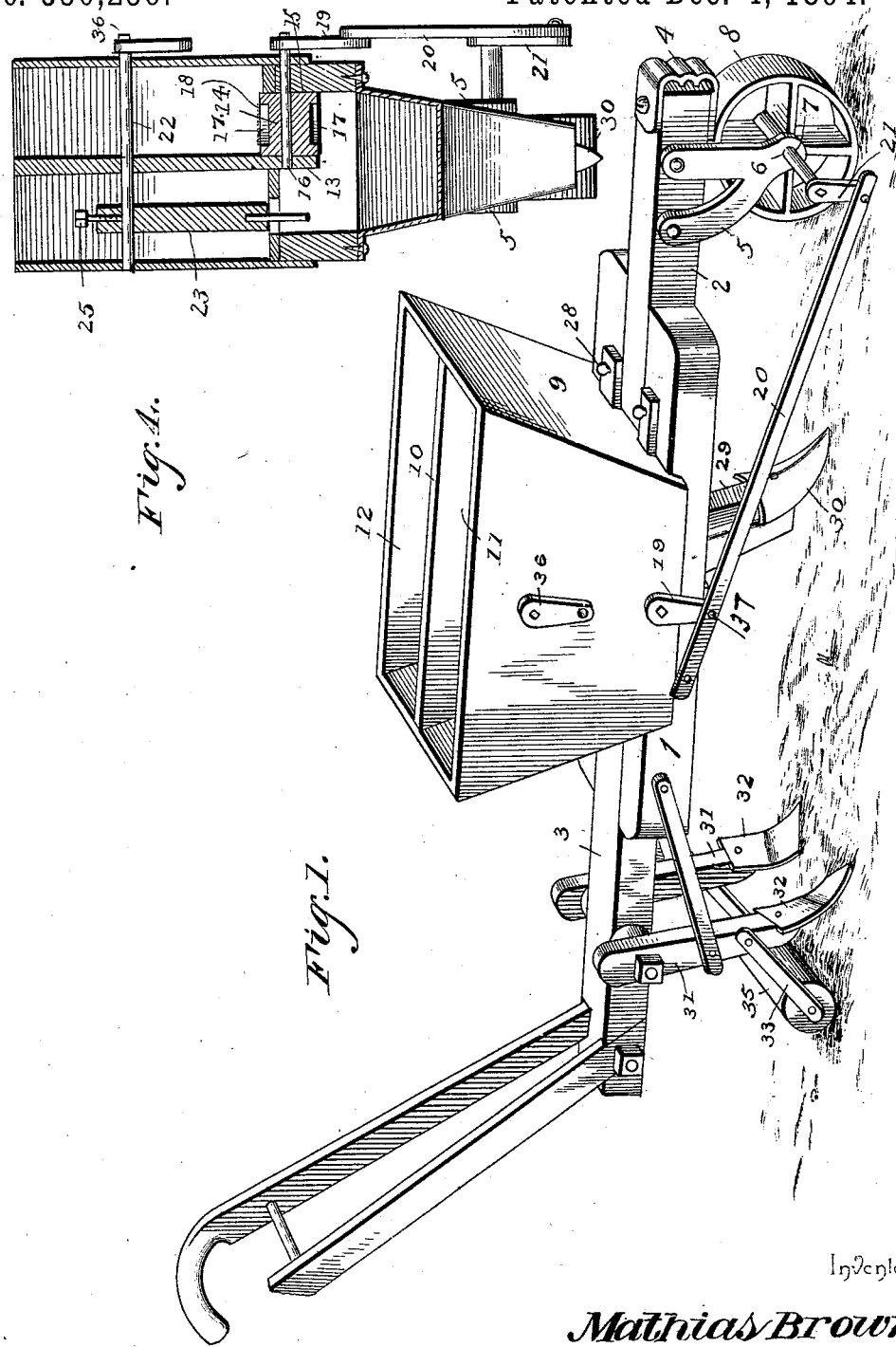

UNITED STATES PATENT OFFICE.

MATHIAS BROWN, OF MADISONVILLE, TEXAS.

CORN OR COTTON PLANTER.

SPECIFICATION forming part of Letters Patent No. 530,256, dated December 4, 1894.

Application filed May 8, 1894. Serial No. 510,515. (No model.)

*To all whom it may concern:*

Be it known that I, MATHIAS BROWN, a citizen of the United States, residing at Madisonville, in the county of Madison and State of Texas, have invented a new and useful Corn or Cotton Planter, of which the following is a specification.

My invention relates to improvements in planters, and has for its object to provide a simple, inexpensive, and efficient combined corn and cotton planter, which may be adjusted for use in either capacity with facility.

Further objects and advantages of the invention will appear in the following description, and the novel features thereof will be particularly pointed out in the appended claim.

In the drawings:—Figure 1 is a perspective view of a planter embodying my invention. Fig. 2 is a longitudinal section taken through the corn compartment of the hopper or seed-box. Fig. 3 is a similar section taken through the cotton compartment of the hopper. Fig. 4 is a transverse section, on the line 4—4 of Fig. 2.

Similar numerals of reference indicate corresponding parts in all the figures of the drawings.

The frame-work of the improved planter comprises the side-beams 1, which are disposed parallel with each other, the draft-beam 2 which is secured at its rear end between the side-beams, and a rear-beam 3 secured between the rear ends of the side-beams. To the front or draft-beam are secured the draft-clevis 4 and the depending brackets or hangers 5, provided at their lower ends with bearings 6 in which are mounted the journals 7 of the ground or operating wheel 8.

The hopper 9 is supported upon the side-beams of the frame and is divided by a central longitudinal partition 10 to form twin compartments, of which the compartment 11 is adapted for corn while the compartment 12 is designed for cotton or other similar material. The space between the side-beams, beneath the hopper, is divided by a longitudinally disposed bar 13 arranged directly beneath the partition, to separate the outlets from the two compartments of the hopper and also provide means for supporting the seed-roll 14 which is arranged in the outlet-opening 15 of the corn-compartment, said bar and a corresponding part of one of the side-beams being provided with bearings for the reception of the trunnions 16 of said roll. The seed-roll is provided at diametrically opposite points of its surface with the cavities or seed-cups 17, adapted to receive the corn or other seed from the interior of the hopper and carry it out through the outlet opening, brushes 18 being disposed at opposite sides of the opening to remove the surplus grain and prevent the choking or clogging of the outlet. These brushes rest at their free ends upon the surface of the roll and remove all grain except that which is received wholly within the cavities or cups. One trunnion of the seed-roll is extended beyond the outer side of the hopper and is fitted with an arm 19 which is connected, by means of a pitman 20, with the free end of a crank-arm 21 secured to a corresponding journal of the ground or operating wheel, whereby as the latter is rotated by the contact with the ground during the forward movement of the machine, the seed-roll is rocked or oscillated to discharge the corn in hills.

An agitator shaft 22 is mounted in bearings in the side-walls of the hopper, and to it is secured the agitator 23, provided with the radial fingers 24, said agitator being fixed to the shaft by means of a set-screw 25 whereby when the cotton planting mechanism is in use the agitator may be disposed in the other compartment of the hopper.

The cotton compartment of the hopper is provided with an elongated feed or outlet opening 26, which is fitted with slides 27 adapted to be adjusted to enlarge or diminish the opening; the slides being secured at the desired adjustment by means of set-screws 28.

Depending from the frame in rear of the ground or operating wheel and in advance of the seed boxes is a standard 29 carrying the furrow-opening shovel 30, and in rear of the seed-boxes are arranged the standards 31 carrying the covering shovels 32. Swinging arms 33, fulcrumed to the covering-shovel standards near their lower ends, extend rearward and terminate in bearings 34 in which are mounted the trunnions of the roller 35, which thus follows the covering shovels and compresses the earth after the completion of the planting operation. The loose arms which support the roll allow the latter to follow any irregularities of the surface of the soil.

The agitator shaft is provided upon the end corresponding with that of the seed-roll to which a crank arm is attached, with a corresponding arm 36, and the crank-pin 37 by which the end of the pitman is attached to the free end of the arm 19 may be transferred to the arm 36 to attach the pitman thereto when the device is used for planting cotton.

From the above description the operation of the device will be readily understood without further explanation, and it will be seen that the construction thereof is simple, and that by the change of attachment of the rear end of the pitman it may be changed from a corn to a cotton planter. It will be understood, furthermore, that various changes in the form, proportion, and minor details of construction may be resorted to without departing from the spirit or sacrificing any of the advantages of the invention.

Having thus described my invention, I claim—

In a planter, the combination with a supporting frame, a ground-wheel, and furrow opening and closing devices, of a hopper having twin compartments provided with independent outlet openings, seeding devices arranged in operative relation with said outlet openings, one of said seeding devices comprising a rocking roll provided with seed-cavities and having one of its trunnions fitted outside of the hopper with a crank-arm, an agitator shaft mounted in bearings in the sides of the hopper, an agitator adjustably secured to said shaft, by means of a set-screw, a crank-arm fixed to the outer end of said shaft, a pitman pivotally connected to a crank arm on the trunnion of the ground-wheel, and an adjustable crank-pin carried by the other end of the pitman and adapted to engage openings in the crank-arms of the seed-roll and agitator-shaft, substantially as specified.

In testimony that I claim the foregoing as my own I have hereto affixed my signature in the presence of two witnesses.

MATHIAS $\overset{\text{his}}{\times}$ BROWN.
mark

Witnesses:
R. C. BURTIS,
T. J. FORD.